United States Patent
Schneible, Sr.

(10) Patent No.: US 6,873,881 B1
(45) Date of Patent: Mar. 29, 2005

(54) AUTOMATED PAPERLESS ORDER SELECTION SYSTEM

(76) Inventor: Seth R. Schneible, Sr., HC1 Box 1145, Tafton, PA (US) 18464

(*) Notice: Subject to any disclaimer, the term of this patent is extended or adjusted under 35 U.S.C. 154(b) by 59 days.

(21) Appl. No.: 09/942,160

(22) Filed: Aug. 30, 2001

(51) Int. Cl.$^7$ ................................................ G06F 7/00
(52) U.S. Cl. ...................................... 700/216; 700/229
(58) Field of Search ................................. 700/216, 229

(56) References Cited

U.S. PATENT DOCUMENTS

| | | | |
|---|---|---|---|
| 3,285,437 A | | 11/1966 | Lemelson .................. 214/16.4 |
| 4,415,975 A | | 11/1983 | Burt .......................... 364/444 |
| 4,673,932 A | | 6/1987 | Ekchian et al. ......... 340/825.54 |
| 4,783,740 A | | 11/1988 | Ishizawa ..................... 364/403 |
| 4,792,273 A | | 12/1988 | Specht ........................ 414/786 |
| 5,509,538 A | * | 4/1996 | Spindler et al. ............. 209/630 |
| 5,640,002 A | * | 6/1997 | Ruppert et al. .............. 235/472 |
| 5,771,657 A | * | 6/1998 | Lasher et al. ................... 53/55 |
| 5,781,443 A | | 7/1998 | Street et al. ............ 364/478.02 |
| 5,875,434 A | | 2/1999 | Matsuoka et al. ............. 705/28 |
| 5,953,234 A | | 9/1999 | Singer et al. .......... 364/478.02 |
| 6,061,607 A | | 5/2000 | Bradley et al. .............. 700/216 |
| 6,185,479 B1 | | 2/2001 | Cirrone ....................... 700/216 |
| 6,188,991 B1 | | 2/2001 | Rosenweig et al. ........... 705/29 |
| 6,193,160 B1 | * | 2/2001 | Zembitski .............. 235/472.01 |
| 6,275,743 B1 | * | 8/2001 | Kondo et al. ................ 700/214 |

OTHER PUBLICATIONS http://jeka.nl/rackr.html, Mar. 8, 2001 archive.*
Modern Materials Handling, Hanover Fair '98, Jul. 1998.*
JEKA, Inc. RackRunner® Order Picking System description from JEKA Web site (2 pages).

* cited by examiner

Primary Examiner—Donald P. Walsh
Assistant Examiner—Michael E Butler
(74) Attorney, Agent, or Firm—Charles A. Wilkinson; Clinton H. Wilkinson

(57) ABSTRACT

Provided is an automated paperless order selection system of the type wherein an electronic order picking unit moves horizontally along a rail directly to a product storage location, thereby decreasing the distance traveled by the order picker and improving the accuracy of the order picking process, such order picking unit having an incremental encoder means for determining its exact location on the rail, and having a wireless radio frequency data communication (RF/DC) capability, and preferably including a printer, bar code scanner as well as audit and inventory report features.

18 Claims, 6 Drawing Sheets

```
                BEGIN PICK PROGRAM
         TIME: 08:31        DATE: 02/06/2001

1. FUNCTION: PRESS POWER TOGGLE "ON"
2. ENTER YOUR OPERATOR I.D.#
   WAIT FOR ACKNOWLEDGEMENT MESSAGE
3. ENTER:PICK UNIT START LOCATION (#ON VERTICLE POST)
4. PRESS: GREEN "GO" BUTTON
   BEGIN PICK OPERATION
```

| 1 | 2 | 3 | 4 | 5 |
|---|---|---|---|---|
| 6 | 7 | 8 | 9 | 10 |

```
                   ACTIVE SCREEN
         TIME: 08:35        DATE: 02/06/2001
PICK LOCATION: ZONE#3- LOCATION: A002
PICK: (5) CASES-DESENEX 12 OUNCE
   SKU #005693
LOCATION: LEVEL 1-SLOT#3
PRINT: ONE LABLE EACH CASE AND APPLY
PRESS: GREEN "GO" GUTTON
FOLLOW TO NEXT LOCATION
```

| 1 | 2 | 3 | 4 | 5 |
|---|---|---|---|---|
| 6 | 7 | 8 | 9 | 10 |

AUTOMATED PAPERLESS ORDER SELECTION SYSTEM

BACKGROUND OF THE INVENTION

1. Field of the Invention

The present invention relates to inventory order selection or logistics systems and methods, and more particularly to systems for aiding order picking personnel in correctly and quickly filling orders, and more particularly still to automated paperless order selection systems of the type wherein an electronic order picking unit moves horizontally along a rail directly to a product storage location, thereby decreasing the distance traveled and time spent looking for the ordered product by the order picker and improving the accuracy of the order picking process.

2. Preliminary Discussion

A number of logistics systems for assisting order picking personnel in quickly and accurately filling orders in a warehouse environment are known in the prior art. Currently, such systems are used primarily in situations where workers must pick the correct number and type of individual units of a product ordered from a series of bins, and are designed to decrease both the number of selection errors committed and the time involved in each picking process or operation. However, in bulk inventory environments, wherein multiple units of a product are stored in cartons or cases, typically on a shelf or rack structure, rather than as individual units, it is still relatively common for order picking personnel to fill such orders using only a paper order form or listing of the ordered products, without the assistance of an automated order selection system. Upon receipt of an order for one or more cartons of a particular product, the worker will, usually relying on memory, locate the storage area for such product cartons, manually pick or remove from such storage area the number of cases or cartons indicated on the order list, move the cartons to a delivery station, and manually check, initial, or otherwise indicate on the order form whether or not the picking process has been successfully completed.

While paper order selection systems are somewhat reliable in relatively small or stable warehouse environments, in larger environments, where hundreds or even thousands of different items are stored, such paper based order systems are clearly inadequate. For example, as indicated above, order picking personnel using a paper system rely primarily on memory to quickly find each storage location, or at least to locate the general storage area for each type of product. However, the larger the warehouse or storage area, the more difficult it becomes for employees to remember all of such storage locations. In addition, employee turnover rates are likely to be higher in larger warehouse environments, so that even if certain longtime employees learn to quickly locate and pick items, newer employees are much less efficient and will waste significant time searching for such items. Thus, manual or paper picking in large warehouse environments is likely to be very inefficient.

It is also well known that order picking can be fairly tedious for the worker. As a result, even longtime or highly skilled personnel may make a larger than usual number of picking errors over his or her work shift, often accidentally picking the wrong type or quantity of a product. Such errors become even more prevalent where there are a number of separate but related products in a product line, such as, for example, where clothing items are sold in several different colors or styles. In addition, orders processed using paper systems are much more likely to be delayed, lost, or misplaced, than in automated systems, due to the human error factor.

In general, previous automated or paperless order picking systems have been either too expensive or too complicated to be implemented in a bulk inventory environment, or where implemented have been ineffective. Thus, there is still a need for an automated system to assist or aid order picking personnel in quickly locating the correct storage location for a given order. Such system should not only be paperless and should lead a worker directly to the correct storage location, but should also provide the order picker with information concerning the number and type of products to be picked, both visually and audibly, should aid the order picker in printing labels or readying such orders for delivery, and should allow the order picker to confirm to the order system when an order has been successfully filled.

3. Description of Related Art

As indicated above, warehouse logistics or order selection systems are generally are known in the prior art. For example, U.S. Pat. No. 4,792,273 issued to D. Specht on Dec. 20, 1988, entitled "Method and Apparatus for Documentless Order Picking of Goods", discloses a documentless, computer-controlled order picking system to direct order pickers in selecting items from a series of bins, after which the items are placed into transport containers. Each time items are removed or picked from a bin, an acknowledgement switch indicates such picking to a central computer. In addition, illuminated arrows above each rack indicate generally the direction the order picker should move to pick the next item. Such indicator lights are stationary, however, and Specht does not disclose the use of an order picking unit or device movable along a rail system.

U.S. Pat. No. 5,781,443 issued to W. L. Street et al. on Jul. 14, 1998, entitled "Apparatus for Use in Parts Assembly", discloses a computerized "kitting" system for directing order pickers in picking the correct number and type of inventory items. In Street et al., display screens are situated over each bin which display to the order picker the correct number of items to be removed from such bins. In addition, a sensing means is used to detect when an order picker places his or her hand in a bin. The Street et al. system is not capable of leading an order picker to a storage location as in the present invention, however.

None of the prior art patents of which the inventor is aware discloses a rack or rail type order selection system similar to the present system. In fact, the inventor is aware of only one other rack-type order selection system, which system is marketed by JEKA, Inc. under the trademark RackRunner®. In the JEKA system, a movable order picking unit is hung on a rail attached to a storage rack. Such order picking unit contains a bar code reader, and as the unit moves along the rail, it reads bar codes spaced along the rail, with each bar code label being indicative of individual storage or picking locations in the storage rack. The picking unit continues to move along the rail reading each bar code label until it locates a code corresponding to the code for the items to be selected, wherein presumably the items are stored in such location. The quantity of goods to be picked is displayed on a small display window on the picking unit, possibly along with other related information. The completion of the picking process can be signaled or confirmed to the system upon completion of picking at each location by pressing a button on the picking unit, which sends a confirmation signal to a central computer.

While the JEKA system operates in a manner that is broadly similar to the present inventor's system, it has several disadvantages not found in the present system. First, as indicated above, the JEKA system relies on a bar code scanner to read preprinted bar code labels adhered to the rail structure to identify each individual storage location. Thus, in the JEKA system the order picking units cannot move directly to individual storage locations, but instead must check each bar code along the rail, stopping only when the desired or correct code is encountered. Not only is it inconvenient and time consuming to adhere such bar code labels to the rail, which process is also subject to error, but it also requires that the picking units contain an internal scanner for reading each bar code. In addition, the physical positions of each picking unit on the support rail can only be imprecisely determined either visually or based on the position of the last bar code it has checked, making it difficult if not impossible to coordinate multiple picking units on a rail at the same time.

In contrast, in the present system, rather than relying upon bar codes to identify a picking location, each of the picking units contains an incremental encoder so that the precise position of the order picking units along the support rail can be easily identified at any time. The incremental encoder allows for far greater accuracy and precision in controlling and positioning and monitoring the picking units, so that more than one unit can be located on the same rail without fear of such units blocking or running into each other. The use of an incremental encoder rather than a bar code system also allows the units to move directly, and therefore more quickly, to the desired picking location, rather than having to check or read each bar code along the support rail. As a result, the present system does not search for a bar code which will indicate the correct storage location, but rather simply moves directly to such location.

The present system also has several other features not found in the JEKA system. For example, the user interface of the JEKA picking units contains only a small display window, which window is capable of displaying only a limited amount of information about each order to be picked. In contrast, the present inventor includes a touch sensitive display screen or system, which system allows information to be both more easily communicated to the order pickers, and to be input into the system by such order pickers. The present device also includes a pair of separate indicator switches, one for sending signals to the system computer indicating or confirming that an order has been filled, or, if for some reason the order was not successfully completely filled, a separate switch for relaying such information to the central computer. Another important feature of the present system not found in the JEKA system is an internal sound card connected to a speaker attached to the housing of the picking units, which is used to provide audible instructions to the order picking personnel concerning each order picking function. The combination of visible and audible instructions further decreases the possibility of picking errors occurring, as order picking personnel are further reminded of the number and type of products which are to be picked.

OBJECTS OF THE INVENTION

Bearing in mind the problems and deficiencies of the prior art, it is therefore a primary object of the invention to provide a method and apparatus for assisting order picking personnel in quickly locating and picking items of inventory in a warehouse environment.

It is a further object of the invention to provide an automated paperless order picking system comprised of one or more automated order picking units movably secured to a support rail encircling an inventory storage area and controlled by a system computer.

It is a still further object of the invention to provide an automated paperless order picking system such that when an item of inventory is ordered, the order picking unit moves along a support rail, stopping at the storage location for such item, thereby leading the order picker directly to the correct storage location and reducing the distance traveled by such worker and overall time spent filling such order.

It is a still further object of the invention to provide an automated paperless order picking system wherein each of the order picking units includes an incremental encoder which enables the exact position of the order picking units to be precisely determined at all times.

It is a still further object of the invention to provide an automated paperless order picking system wherein after an order has been successfully filled, such information is conveyed directly to the central computer system via the order picking unit.

It is a still further object of the invention to provide an automated order picking unit having a digital touch screen interface for communicating with both order picking personnel and the system computer.

It is a still further object of the invention to provide an automated order picking unit that may be powered using either by a low voltage power rail or an integral battery.

It is a still further object of the invention to provide automated order picking units having an integral bar code scanner for scanning labels located on picked products to confirm the identity of such products.

It is a still further object of the invention to provide automated order picking units having an integral printer for printing shipping labels or ticketing to be applied to the picked items.

It is a still further object of the invention to provide a software interface program that allows the end user to create a direct interface between an existing warehouse management system and the operational software that transmits the order selection information directly to the order picking units.

It is a still further object of the invention to provide an automated order picking system to aid workers in selecting bulk items of inventory.

It is a still further object of the invention to provide an order picking aid wherein order picking personnel are provided with audible instructions regarding the number and type of products to be picked.

Still other objects and advantages of the invention will become clear upon review of the following detailed description in conjunction with the appended drawings.

SUMMARY OF THE INVENTION

The invention comprises an inventory control and order picking system for use primarily in a warehouse environment. A number of order picking units of the invention are movably secured on rollers to a support rail connected to a storage rack with each unit either battery powered or hard wired to the rail and controlled by a system computer. A unique feature of the invention is the use of an incremental encoder in the order picking units, allowing the precise location of each unit to be determined at all times, and allowing the units to move directly to storage locations along the rail. Data is transferred or communicated between the system computer and the order picking units preferably via wireless radio frequency data communication (RF/DC), although other real time or batch processing communication means may be utilized. Each order picking unit preferably includes a touch screen for displaying information related to each order, as well as a means for indicating whether or not an order has been successfully filled. A speaker is also preferably provided so that not only are order picking personnel reminded of the order visually but also audibly, thereby further reducing the number of picking errors. A bar code scanner on the picking units may be used to verify the identity or "sku" numbers of units of inventory. In addition, a printer is provided on the picking units so that shipping labels or tickets can be printed and applied to cases or cartons immediately at the time such items are picked. In use, after an order has been received and has been input into the system computer, such information is relayed to one or more of the order picking units connected to a support rail surrounding the proper storage location for such items. The order picking unit will then move along the rail, stopping directly in front of the storage location and thereby leading the order picker directly to such location. After the order has been picked, the order picker can confirm such picking to the system computer via the order picking unit. Such units can also be programmed for use at any time to aid workers in conducting inventory audits or counts and to immediately convey such information to management for further analysis.

BRIEF DESCRIPTION OF THE DRAWINGS

FIG. 9 illustrates a typical set up menu on the touch or display screen of the order picking units.

FIG. 10 illustrates a typical active display screen during the picking process.

DESCRIPTION OF THE PREFERRED EMBODIMENTS.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 1:
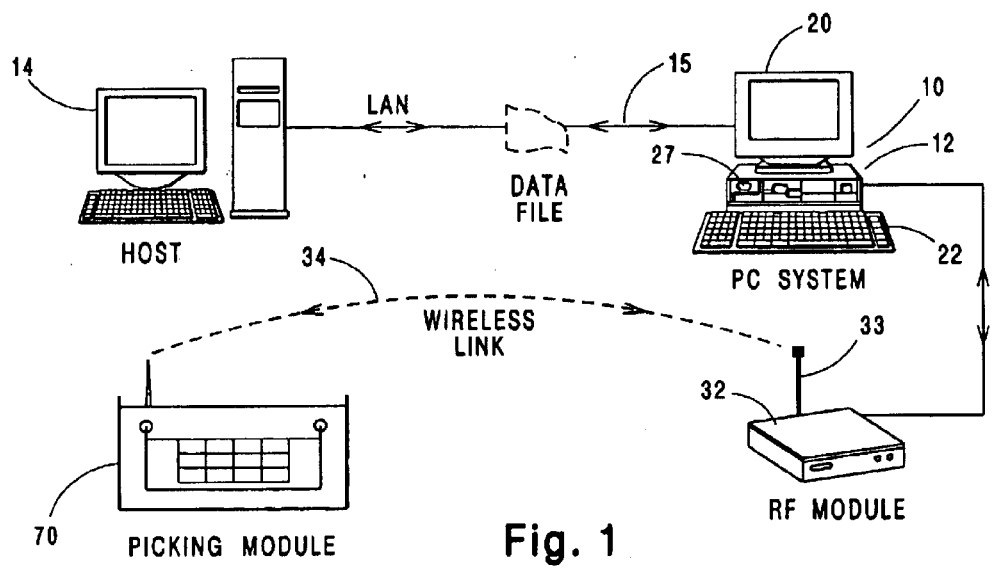
FIG. 1 is a schematic depiction of a control system computer for use with the invention.

FIG. 1 illustrates schematically a control system that can be used to control the inventor's order picking system. As used herein, the term "inventory" refers to a given supply of products or items. The terms "products" or "items" may refer either to individual units or pieces of inventory or to a plurality of units or pieces packaged in cases or cartons. In addition, the term "list" generally refers to a plurality or collection of inventory items such as might comprise a single order.

The automated paperless order picking system of the present invention is controlled electronically by a system computer such as the computer system or PC 10 shown in FIG. 1. Computer system 10 includes a housing 12 for housing a motherboard which contains a controller or central processing unit (CPU), which can be an Intel Pentium III, Intel Pentium IV, IBM/Motorola Power PC, or other system, and memory (e.g. RAM, SDRAM, RDRAM). In addition, other specialized logic control devices such as a PLC (program logic controller) may be included as desired. Communications line 15 allows the computer to communicate or interface with other computers such as an existing host or central warehouse control or management system 14 if desired, preferably through a local area network (LAN). The computer system 10 further includes various input devices, including a display card for controlling a display which may be a CRT monitor 20, keyboard 22 and mouse (not shown) for inputting and manipulating data, and printer (not shown) for providing printed copies of important records or other information related to the operation of the order picking system. Also included are storage or media devices such as floppy disc drive 27 and hard disc drive, and may include other storage devices such as a compact disc drive, removable tape drive (not shown) and the like.

Also included in computer system 10 is a means for transmitting and receiving signals from the order picking units or picking modules 70. As will be understood, order information may be transmitted or downloaded from the computer to the order picking units 70 in several different manners, such as through a hard-wired power and online data rail communications system. However, while a hard-wired system also provides instantaneous or real time data transfer, in the inventor's most preferred embodiment, information is transmitted via wireless radio frequency data communication (RF/DC). Thus, the control system as shown in FIG. 1 includes an RF/DC transmitter/receiver module 32 having antenna 33 for communicating via a serial wireless link 34 with picking unit 70. Transmitter/receiver 32 can be either external or internal as desired.

Also included in the system computer 10, stored on any one or on a combination of the computer storage or media devices, is software for controlling both the computer hardware and for enabling the system 10 to operate the order picking system and interact with both human users and the automated order picking units 70. Such software may include, but is not limited to, device drivers, operating systems and user applications, such as development tools and (graphical) system monitors. The computer readable media further includes a computer program, according to the present invention, for operating the order picking units, including coordinating the movements of and providing order instructions to such units, the display of such order no information both visually and audibly, tracking orders, operating the optional labeling and bar code scanner features, and the like.

Figure 2:
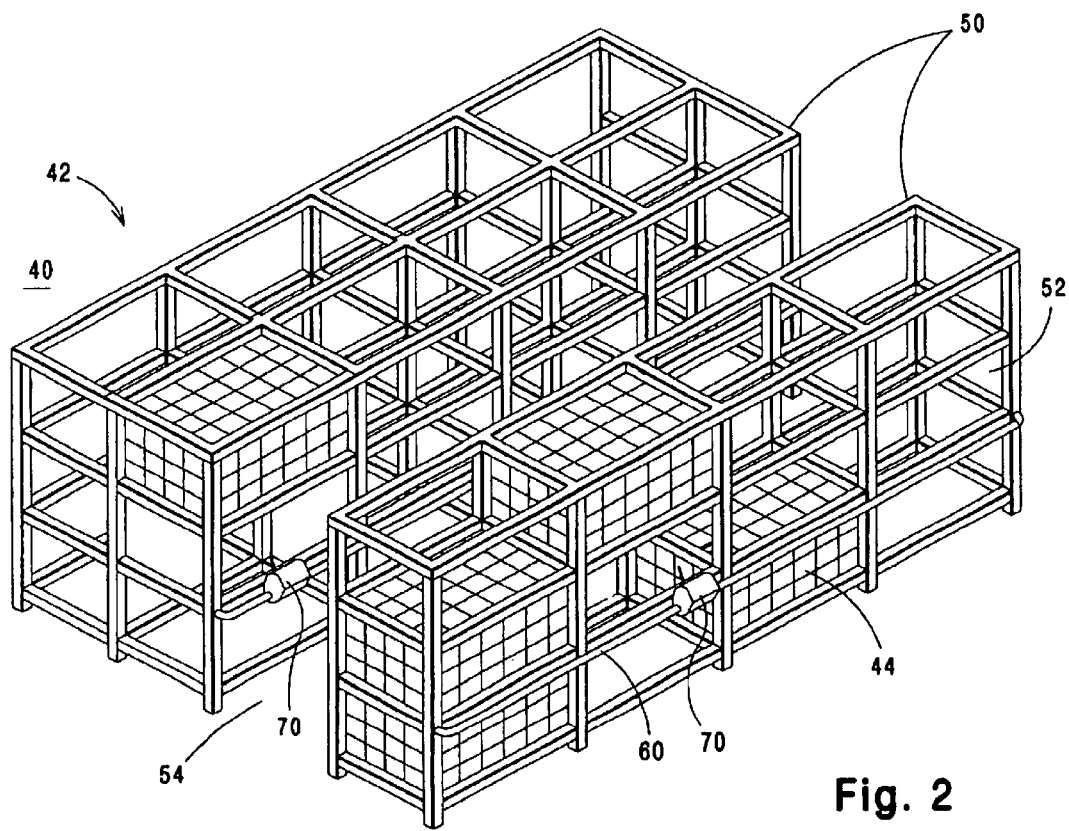
FIG. 2 is an overall isometric view of an example of the order picking system of the present invention in a storage or warehouse environment.

FIG. 2 is an isometric view of part of an apparatus for an automated paperless order picking system 40. System 40 typically will be installed in a storage facility such as warehouse 42, indicated in part and diagrammatically by rectangular outline. For purposes of illustration, it is assumed that warehouse 42 is used primarily for storing bulk inventory items, rather than for storing individual components or parts in open bins from which such components or parts may be picked, as evidenced in FIG. 2 by cases or cartons 44. It will be understood, however, that such cases or cartons 44 are for purposes of illustration only, and that the inventor's order picking system could also be used to aid in picking individual components or parts from bins or the like, as well as in virtually any storage facility regardless of the number and type of related or unrelated items, whether or not they are stored in cases or as individual components, or no matter the size of the storage location.

The automated order picking system 40 comprises at least one storage apparatus or frame 50 defining a plurality of storage racks or shelves 52 arranged above each other and side by side. Frames 50 are preferably aligned in rows defining aisles 54 therebetween, such aisles 54 being sufficiently wide for machinery for moving or carrying inventory to easily navigate. Palette trucks or other storage and retrieval machines of the type known in the prior art may be used to insert and remove items from the upper storage racks. A greater or fewer number of rows or levels and/or columns of racks 52 can be provided depending upon the size and needs of the storage location. In addition, cases or packages 44 may be stored on racks 52 in any suitable manner, such as in stacks, on palettes, or in any other convenient manner.

Figure 3:
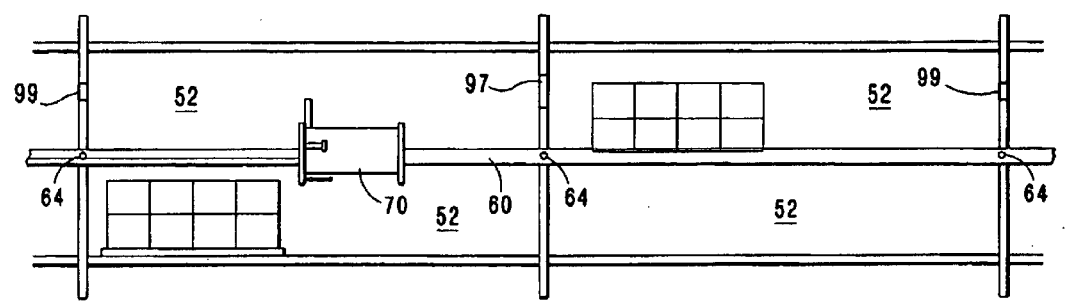
FIG. 3 is an enlarged front view of the track and order picking units shown in FIG. 2.
Figure 5:
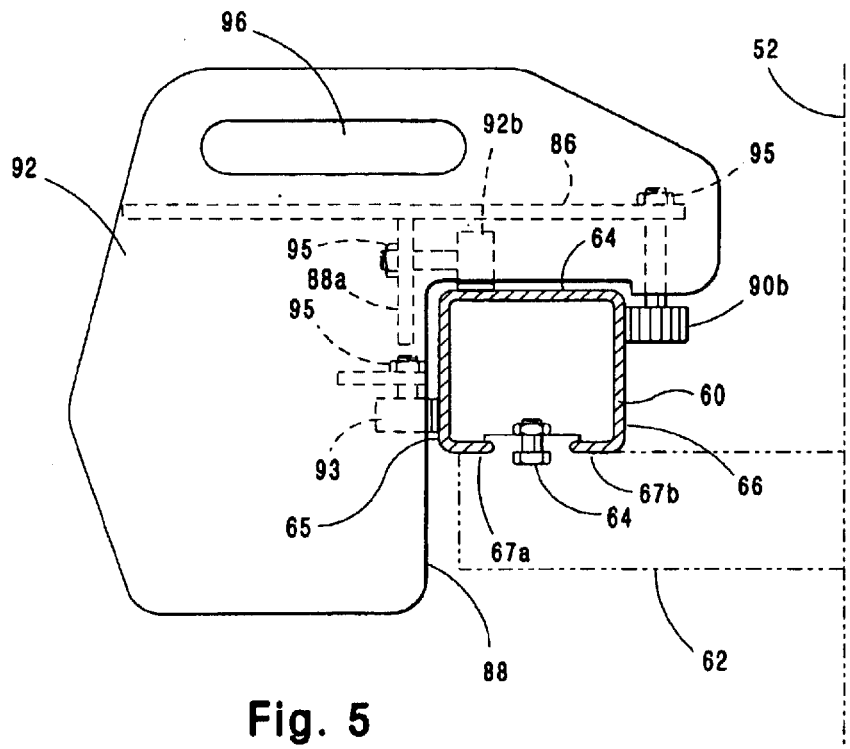
FIG. 5 is a side view of the order picking units.

FIG. 3 is a front view of a portion of the order picking system shown in FIG. 2. Secured along the front surface of the storage racks or shelving 52 at a selected height above the floor, preferably approximately waist high, are horizontal rails, providing a rail line, or track system 60. As shown in FIG. 5, rail line 60 is preferably secured to support 62 by bolts 64 via appropriate washers or other retaining devices, although the rails can also be welded, screwed, or otherwise secured to support 62 or intermediate brackets or the like or directly to racks 52 by any suitable means, either temporarily or permanently. Support 62 is mounted upon storage rack 52 and extends outwardly from the front surface of the rack 52 a distance sufficient so that there is a clearance of at least approximately 2 inches between order picking units 70 and components of the rack 52 when such picking units 70 are mounted on the rail line 60, as will be described in detail below. Although rails 60 may also be secured directly to frame 50 or racks 52, use of an additional support such as support 62 ensures that the order picking units 70 can navigate horizontally along the rail without being impeded by either the frame, inventory items that might inadvertently extend slightly out of the racks 52, or the like. Although not preferred, rail line or track system 60 may alternatively be secured to a separate support structure (not shown), disposed adjacent to and parallel with the racks 52, or in some other manner wherein the rails run horizontally and parallel to the storage racks. However, attachment of the rails 60 along the front of the storage frames 50, as shown in FIGS. 2 and 3, is preferred, as such orientation is more convenient and does not require the use of additional support structures. Although not preferred, rail line 60 may also form a loop around one or more of the storage frames 50, so that order picking units 70 can move between different sections of rails.

Rail 60 is preferably made from aluminum, steel, or other suitable material, and is generally rectangular in shape, comprising upper surface 64, outer surface 65, rear surface 66, and bottom surfaces 67a and 67b (see FIG. 5). In the preferred embodiment, rail line 60 has a width of approximately 2" and a height of approximately 2½". Although rail line 60 could have slightly different dimensions, it has been found by experimentation that a 2"×2½" rail satisfactorily accommodates the order picking units 70. While the rail shown in FIG. 5 is preferably essentially a modified hollowed channel, a solid rail structure could also be used. A suitable rail and linear guide for use with the order picking units is the Black Diamond™ series of polymer linear bearing guides manufactured by Machine Systems, Ltd. of Ann Arbor, Mich.

Figure 4:
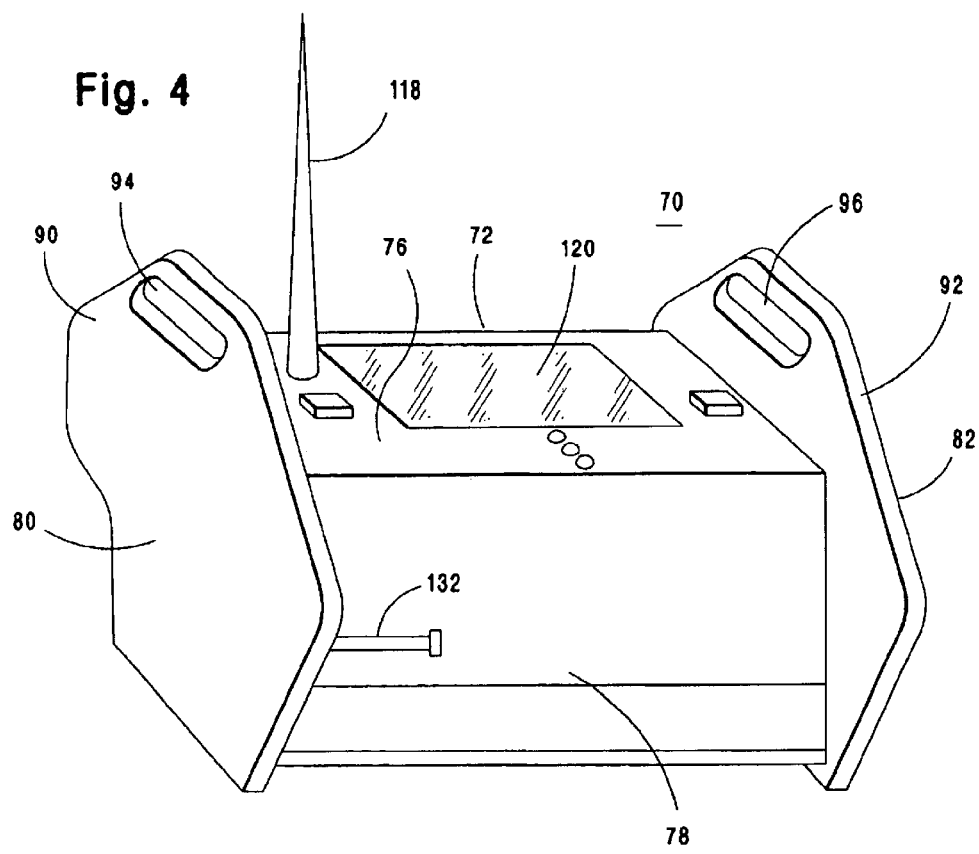
FIG. 4 is an isometric view of a preferred embodiment of the order picking units of the invention.

FIG. 4 is an isometric view of a preferred embodiment of one of the order picking units or modules 70 of the invention. Each unit 70 is portable and is generally comprised of an L-shaped housing 72 having a top surface 76, front surface 78, first and second side surfaces 80 and 82 (not shown), and rear surface 84 (also not shown). In addition, as best shown in FIG. 5, a portion of the housing 72 along the bottom and rear surfaces is cut away so that the housing 72 fits partly around rail line 60, forming inside top surface 86 and inside back surface 88, respectively. Housing 72 is constructed of a suitable material such as ¼" anodized aluminum, with top and front surfaces 76–78 forming covers, preferably constructed of 16 gauge anodized aluminum. However, molded housings may also be utilized in the future. Sides plates or frames 90 and 92 are secured to first and second side surfaces 80 and 82, respectively, with the side frames having slightly larger dimensions than such side surfaces, the ends of the housing 72 forming flanges 91 and 93 extending beyond the sides of the housing. Integral handles 94 and 96 formed by cut out sections in the upper portion of the flanges or side frames 90 and 92 aid in carrying or manually moving the units 70 when required, such as when the units may be periodically removed from the rail for maintenance purposes. Side frames 90 and 92 can be formed from metal plate but are preferably molded from ABS plastic and act as bumpers or guards for the sides of unit 70, absorbing shocks caused by collisions with other units on the same rail, or other impacts which might otherwise cause damage to the electronics or circuitry stored within housing 72. Additional resilient bumpers 96 and 97 may be mounted on the end frames, particularly if these are formed from metal sections. In the preferred embodiment, unit 70 has a length across the front surface 76 of approximately 13 inches, a width of approximately 9.7 inches, and a height of approximately 9.25 inches. The exact dimensions, however, depend on the electronic and particularly screen components which form it.

Figure 7:
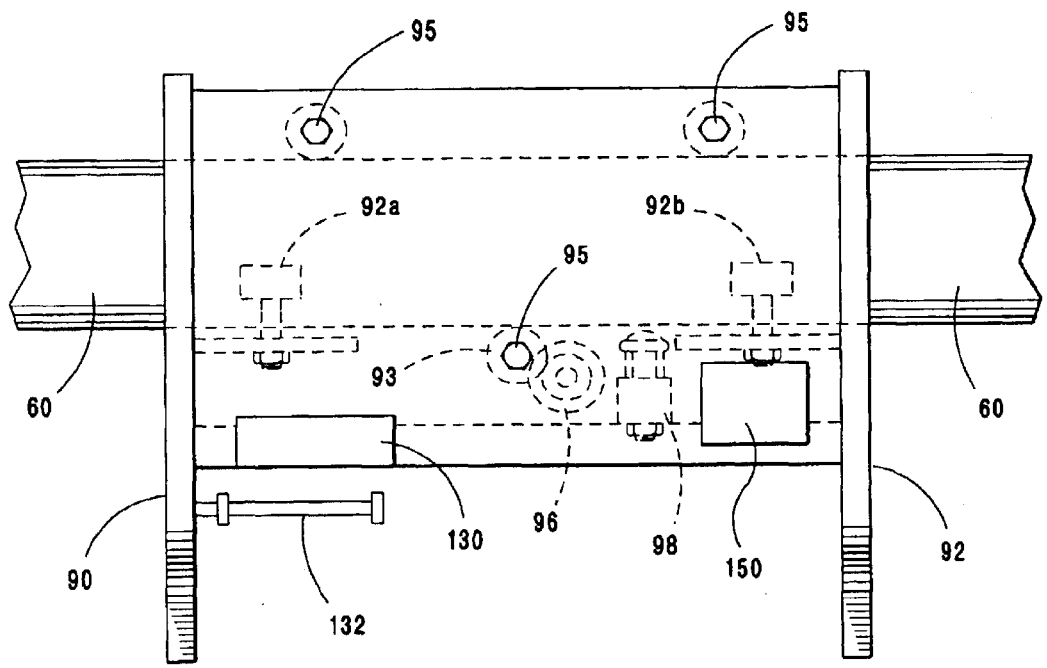
FIG. 7 is a top view of the order picking units with top surface removed.
Figure 8:
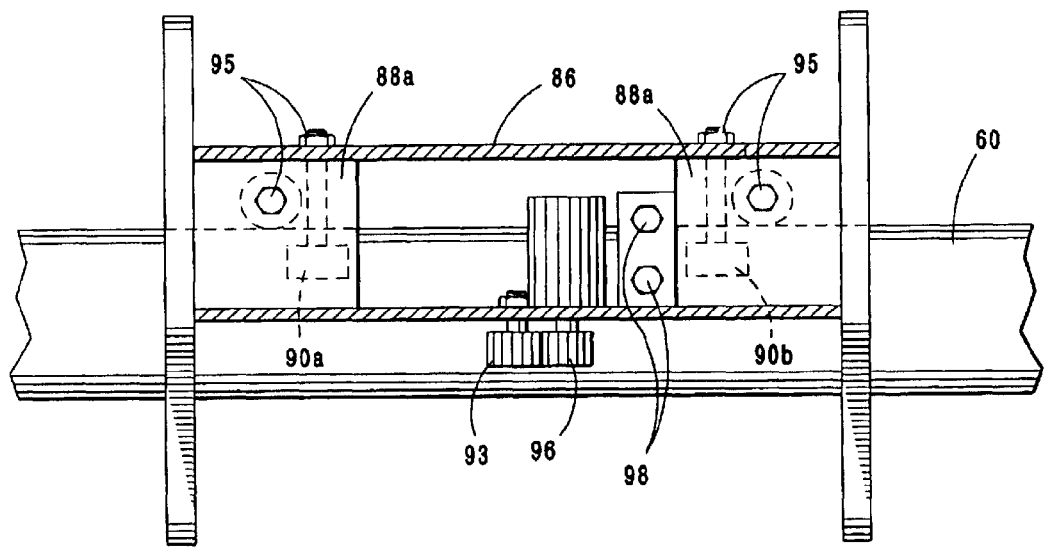
FIG. 8 is a front view of the order picking units.

Order picking units 70 are movably mounted or secured to rails 60 so that the units 70 can move or ride horizontally along the face of the storage racks 52. As shown in FIG. 5, inside top surface 86 extends over the top surface 64 of rail 60, while inside back surface 88 is adjacentthe outer face 65 of such rail. As best shown in FIGS. 5 and 7, which is a top view of order picking unit 70 with top surface 76 removed, the order picking units 70 move along rail 60 on a plurality of rollers. Preferably, at least five separate rollers, designated as 90a, 90b, 92a, 92b, and 93, are provided. Rollers 90a and 90b are secured to housing 72 by bolts 95 spaced along the inside top surface 86 of such housing and extending downwardly so that they engage the rear surface 66 of rail 60. Rollers 92a and 92b are similarly spaced apart and secured by bolts 95 to extension 88a of inside back surface 88 such that they are facing rearwardly and engage the upper surface 64 of rail 60. Roller 93 is secured centrally along the inside back surface 88 of housing 72 so that it engages the outer surface 65 of rail 60. Roller 93 is also attached to motor drive 96 which turns roller 93, causing the unit 70 to move horizontally along rail 60 as instructed by the system computer 10, preferably powered by battery 150, which is preferably stored in the lower portion of housing 72.

Incremental encoder 98 is mechanically connected to the motor drive 96 of each order picking unit 70 and is used to sense and indicate the rotational velocity and angular position of the motor drive 96. This information is used by the encoder to determine the exact position of the order picking unit 70 on rail 60, and results in very close position control of the order picking units along the rail. Such distances are measured in relation to a home or zero position on the rail. The home position acts as a reference position for all subsequent movements of the order picking units 70 and the encoder 98. Depending upon the sophistication of the system, after each picking procedure has been completed, the units may return to an overall home position, wherein the encoders are reset and the units will wait for further instructions. Alternatively, the units may be able to receive further instructions from the last picking position without having to return to the home or zero position to be reset, instead simply moving to the next required picking position. Suitable linear and rotary incremental and absolute encoders for use with the order picking units are manufactured by Gurley Precision Instruments of Troy, N.Y. This can be accomplished by assigning each storage rack section or location with a unique number which, when entered into the system as will be described below, acts as a zero or start location from which the unit 70 can calculate the distance that must be traveled to the next storage location. Periodic readable homing devices may be mounted on the rails from which the position of the picker can be recalculated at any time. Essentially, encoder 98 measures the distance between the initial or zero position and the actual position along the rail. Since the position of each storage location, or alternatively homing position, along the rail is known, the order picking units can move directly to the next target position of the unit 70. Furthermore, any inaccuracies caused by slippage of drive wheel 93 can be compensated for. Such homing devices are shown diagrammatically in FIG. 3 by reference numeral 97, and can be magnetic, electronic, or other devices providing a continuous coded signal of location. While both types of encoders may be used, the second type is preferred as it is capable of moving the order picking units directly to the next position and is therefore faster.

To verify that the units 70 stop at the correct picking location, further numeric coded strips 99 on racks 52 are optionally provided (see FIG. 3). To read such strips 99, also included in each unit 70 is a reader 101. Preferably, upon stopping at each location, the reader 101 will automatically read such strips 99 to verify the correct location. Thus, strips 99 provide order picking personnel with immediate confirmation as to whether or not the order picking unit 70 has located the correct picking location.

Figure 6:
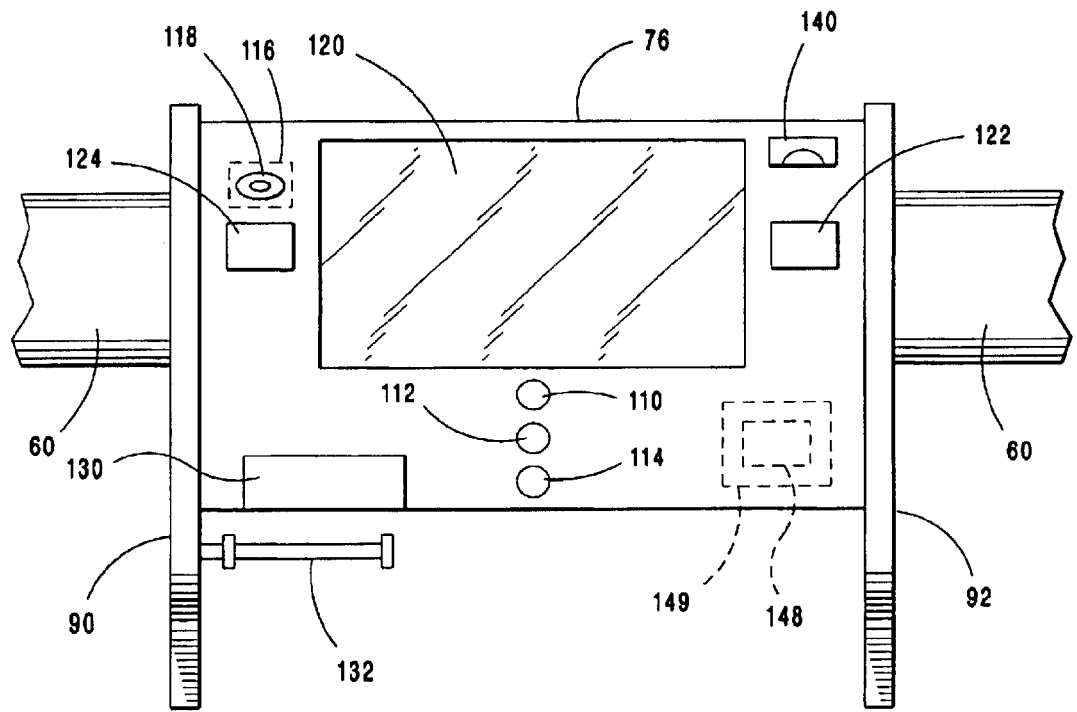
FIG. 6 is a top view of the order picking units.

FIG. 6 is a top view of one of the order picking units 70 of the invention, showing top surface 76 and side frames 90 and 92. Positioned along a central line on top surface 76 are status lights or indicators 110, 112, and 114. In the preferred embodiment, status light 110 is an error light for indicating whether or not the unit 70 is functioning properly. Status light 112 indicates the status of the battery 150, i.e. whether or not such battery is working properly or needs to be recharged or replaced. Preferably, battery 150 is rechargeable and should have sufficient capacity to power the unit 70 for at least approximately 8 hours. A lithium ion or lithium polymer rechargeable battery or battery pack assembly such as manufactured by Nexergy Electronics based in Columbus, Ohio, is suitable for use with the invention. Status light 114 can be indicative of various functions of the system, such as whether or not instructions have been properly received from the central computer, or whether the numeric coded strips 99 confirm that the correct picking location has been identified. More or less indicator lights may additionally be provided depending on the needs of the user. RF/DC receiver 116 having antenna 118 is provided in the preferred embodiment to allow the order picking units 70 to communicate with central computer 10. Wireless technologies for warehousing and logistics management developed by LXE, an EMS Technologies Company of Norcross, Ga., such as antenna model no. RR90-17 and RR90-17-02, may be used with the order picking units.

A touch sensitive display screen or apparatus 120 is preferably located generally centrally on top surface 76 of housing 72. As indicated above, top surface 76 may be slightly forwardly angled so that the display screen 120, status lights 110–114, and other features included in the units 70 are more easily viewed and utilized by order picking personnel. Display screen 120 may also be located on an alternate surface such as the front panel 78 in certain installations, for example, a unit on a rail located near or above the eye level of the order picker so that the display screen can be easily read or seen and/or accessible. Screen 120 serves as the primary interface and means of communication between the order picking units 70, order picking personnel, and the system computer 10. Typically, touch sensitive displays comprise a display device having a transparent touch screen mounted on the display screen. Sensors on the touch screen are sensitive to a touch on the touch screen by, for example, a stylus or an operator's finger. A touch screen processor then converts the outputs of the sensors into Cartesian coordinates indicative of the position of the touch on the screen. Such coordinates are then input into a processor or system computer, which system responds to the input touch as programmed. Various commercially available touch screen displays are suitable for use with the invention. These include Clear Tek™ touchscreens manufactured by 3M Touch Systems of Austin, Tex. and touch display products manufactured by Touch Controls, Inc. of Fallbrook, Calif., which are particularly designed for use in harsh environments and are available in various screen sizes, display formats, and configurations.

Touch screen 120 represents a significant improvement over previous display systems used in prior art picking units, as it allows a larger and clearer viewing screen to fit in the same space and provides a much more user-friendly and more easily understandable interface. In addition, touch screen 120 eliminates the need for the usual plurality of buttons or knobs which must be individually pressed to communicate with the system. To substantially reduce heavy use of touch screen 120 in activating unit 70, although not required, activator or contact switch 122, preferably colored green, is provided to activate the unit 70, as well as to provide an improved means for order picking personnel to indicate to the order picking system when a task has been successfully completed. Also optionally provided is a second activator or contact switch 124, preferably colored red, which is used by order picking personnel to indicate to the system when an error in the picking process has occurred, or when a task has not been successfully completed. Switches 122 and 124 are of a type known in the prior art, although other types of switches that are easily replaced or modified can be used.

A further important innovation of order picking units 70 is the ability to provide order picking personnel not only with written instructions concerning each order, but also with audible instructions. Sound card 148 is secured in housing 72 and receives signals from a communication means such as RF/DC receiver 116, which signals are then converted into audible sounds by sound card 148. Such sounds are then broadcast to the order pickers over one or more speakers 149. Preferably, speaker 149 is located on either the top or front surface of housing 72 so that the sound is not blocked or muffled by portions of the housing or the side frames of housing 72, or other structures.

Using speakers 149, information such as the storage location and/or level, product number and type, and number of items to be picked, will be audibly conveyed to the order picker, as well as shown on the display screen 120. Such instructions, both on the display screen 120 and through speakers 149, may be in any language, so that the present order picking system can be effectively used in any country. In addition, if necessary, individual units in the same storage facility can be programmed to communicate in different languages depending upon the languages spoken or best understood by the order picking personnel. The combination of visual instructions on the display screen 120 and audible instructions from speaker 149 act as further reminders to order picking personnel as to the number and types of products to be picked, thereby significantly decreasing the number of errors that occur in the picking process. As a further feature, an audible feedback device can be built into the touch pad for immediate feedback as the order picker enters information into the system. Suitable means for accomplishing such audible feedback or speaker systems are well known and should be evident to those skilled in the art.

Besides serving as an aid for quickly locating storage locations in a warehouse, thereby decreasing the time and distance traveled by the order pickers, and acting as a user-friendly interface between the order pickers and the order selection system, order picking units 70 may also include a variety of additional features which further simplify the order picking process. For example, order picking unit 70 may include a printer unit 130, shown in FIG. 6 mounted on top surface 76 of housing 72. Suitable printers include any one of the Encore™ series of direct thermal mobile printers manufactured by Zebra Technologies Corporation based out of Vernon Hills, Ill. Printer 130 allows order picking personnel to immediately print adhesive address or travel ticket labels to be applied to each case or carton being picked. Such process is accomplished quite simply, since the address information will already have been entered into the system at the time the order information is transferred to units 70. Thus, such information can simply be selected and printed in a manner known to those skilled in the art. Alternatively, information can be keyed into the unit 70 using either touch pad 120 or a separate means on printer 130. Label spool 132 for holding a roll of adhesive labels may be secured to the inner side of side frame 90, extending over front surface 72, although such labels may also be housed within the printer unit itself.

Another optional feature that may be included with the order picking units is a bar code scanner 140. Scanner 140 is preferably external and attached to unit 70 at bar code scanner port 142, although an internal scanner may also be provided. A suitable external scanner for use with the order picking units is hand held laser scanner model no. DLL5510-M manufactured by Datalogic S.p.A of Bologna, Italy. Scanner 140 may be used by order picking personnel to read bar code labels that are typically adhered to each of the cases or cartons to be picked to verify the contents of such case. In addition, new bar codes can be printed using printer 130. Such new bar codes can be provided separately or on the identification or travel ticket labels.

Operation of the invention will now be described with reference to FIGS. 9–11. First, the order picking unit 70 is placed on the section of rail 60 which passes in front of the correct storage location to be picked. To begin the picking process, each order picker must follow a specific routine to activate a designated order picking unit 70. Referring now to FIG. 9, which is a front view of touch pad 120 showing a typical set-up routine, after the unit 70 is turned on, the order picker will be prompted to key in his/her identification number to verify his/her identity by pressing the numbers 126 corresponding to such identification number. The green "enter" or "go" switch 122 (see FIG. 6) is then pressed to enter such information into the unit 70, which information is then transmitted to the system computer 10 for verification. After the order picker's identity has been verified by the system computer 10, the "start location" of the order picking unit 70 must be entered. As indicated above, in the preferred embodiment, each pick or storage location will be assigned a unique number, each corresponding to a particular "start location," which number will be posted at each storage location in a visible area. After such information has been entered and acknowledged by the computer system, the order picking unit 70 is ready to for use.

When an order is received into the system computer 10, a software program will formulate specific instructions which are transmitted to and received by the order picking unit 70, preferably via RF communication. In response to such instructions, order picking unit 70 will then move horizontally along the track system 60, with the order picker usually walking closely behind, although the picker may sometimes be intersecting with the picking unit from some other position, until unit 70 reaches the specified storage location. As illustrated in FIG. 10, the picking unit will then display information related to the number and type of goods to be picked at such location, including the exact pick location (preferably including the level in a multi-level rack structure), sku number of the goods, quantity and type of products, as well as time and date. Incremental encoder 98 allows picking unit 70 to move directly to the specified storage location, rather than searching for such location by reading bar codes or the like. The picking units 70 are capable of moving in either direction along the rail system 60, although for obvious reasons the units will usually move in the same direction. In addition to the instructions on touch screen 120, if activated, the order picker will also receive audible instructions via sound card 148 and speaker 149, such audible instructions being essentially the same as the information displayed on touch pad 120. The order picker will then proceed to pick from the storage location the required number and type of products.

To verify that the proper products have been picked, the order picker may then scan the bar code labels on the cases or cartons 44 using external scanner 140, the results of which scan may be displayed on display screen 120, or even audibly confirmed. The order picker may also wish to print bar coded identification labels using printer 130, which labels are placed on the picked cases as they are readied for shipping. The picked goods may be marked in some obvious manner for transporting personnel. The picked goods are presumably then carried or transported to the warehouse shipping or loading area using regular warehouse procedures. Alternatively, if only a single order is being picked, the picker may immediately personally transport such order.

If the proper number and type of items have been picked, such information is transmitted to the central computer system by the order picker, who is instructed to press the "enter" switch 122. After the confirmation has been transmitted from the order picking unit 70 to the system computer 10, computer 10 will transmit the next order picking instruction to the order picking unit 70, the unit 70 moved to the next designated order storage location, and the procedure is repeated. If, on the other hand, the proper number and/or type of items ordered are not available, are damaged, or have not been picked for some reason, the order picker will press the red "stop" switch 124, thereby informing the central computer system of such unavailability. At this time, the computer 10 may instruct the order picking unit 70 to move to the next designated storage location, or alternatively may suspend the picking operation until the exact nature of the problem has been deduced. The units 70 may also include means by which the order picker can more specifically indicate the nature of any problems encountered during the picking process.

Figure 11:
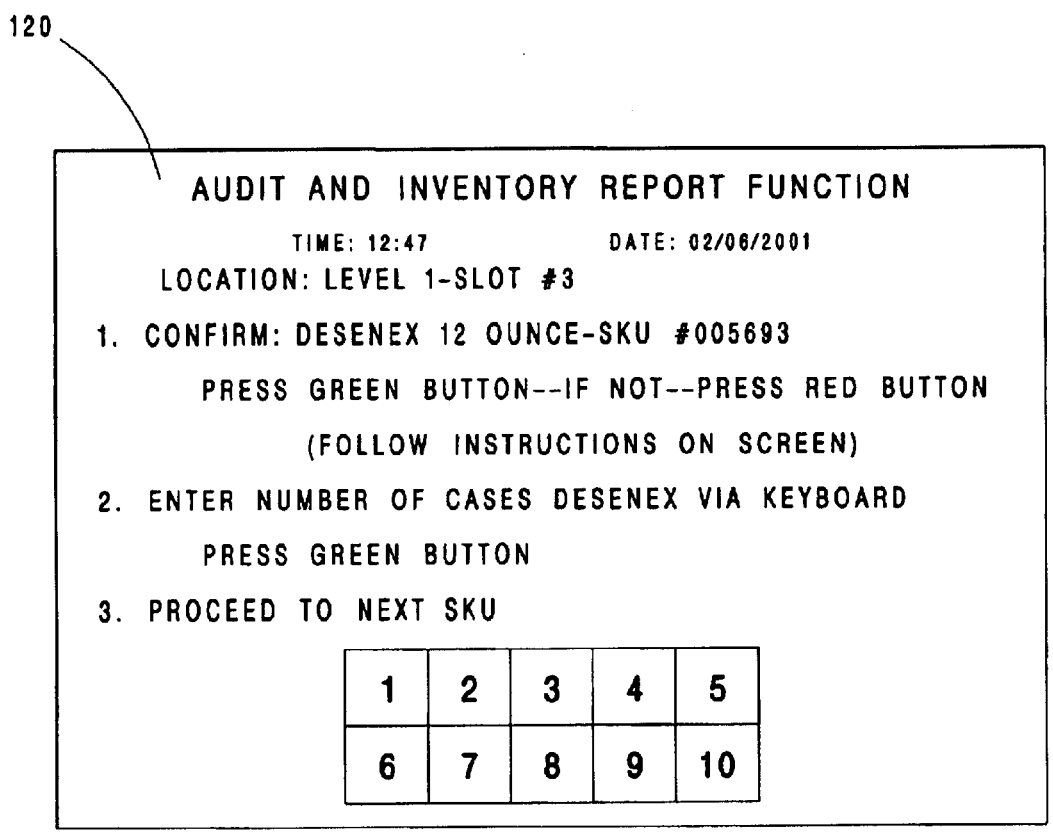
FIG. 11 illustrates a typical display screen during the audit or inventory process.

FIG. 11 is a view of touch screen 120 illustrating a further optional feature of the order picking units 70. As shown in FIG. 11, order picking units 70 have the further unique capability of being used to assist in performing audit and inventory functions. When a count or audit of particular items of inventory is needed, audit personnel will move to the storage location designated by the order picking unit 70, wherein first they must confirm the type of products actually stored in such location. Typically, such audits or confirmations are based on the "sku" number of the products. If the "sku" number is correct, the audit personnel is instructed to press the green "enter" switch; otherwise the red "stop" switch is to be pressed. If the correct "sku" number is confirmed, audit personnel are then instructed to perform a physical count of such inventory, which result is then keyed into the system using touch screen 120. The order picking unit 70 will then move to the storage location or location of the next product "sku" number to be counted, wherein the process is repeated. Such audits can be used to record information such as the total number of units available, the number of units in the racks, the number of units in any reserve storage area, and the number of units moved from such reserve storage area to the main picking area. Once such audit information is keyed into the touch pad 120, it will be instantly relayed to the central computer system 10, wherein it can be either stored, printed, routed to a supervisor, or otherwise manipulated.

As should be evident to those skilled in the art, the invention can be conveniently implemented using a conventional general purpose digital computer or microprocessor programmed according to the teachings of the present specification. Appropriate software coding can be prepared based on the teachings of the present disclosure, as will be apparent to those skilled in the software art. The invention can also be implemented by the preparation of application specific integrated circuits or by interconnecting an appropriate network of convention component circuits, as will be readily apparent to those skilled in the art.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A system for aiding order picking personnel in picking orders comprising:
   (a) a system computer;
   (b) a storage frame;
   (c) a substantially horizontal track system mounted to said storage frame, with one or more order picking units each having a motor drive movably secured to said track system;
   (d) rotary encoder operably connected to the motor drive of each of said one or more order picking units for generating a feedback pulse signal in accordance with the rotational movement of said motor drive, and a means for tallying said pulse signals to provide a continuous data signal representing the incremental and absolute positions and direction of movement of each of said of one or more picking units, enabling the location of each of said order picking units relative to the track system and relative to each other to be continuously monitored, and further enabling the movements of said order picking units to be precisely controlled by an operator so that the movement of one picking unit does not interfere with the movements of other picking units on the same track system and vice versa;
   (e) means for communicating information between the system computer and the order picking units; and
   (f) means for communicating information between said order picking units and order picking personnel.

2. A system for aiding order picking personnel in picking orders according to claim 1 wherein said means for communicating information between said order picking units and order picking personnel includes a touch pad display screen.

3. A system for aiding order picking personnel in picking orders according to claim 2 wherein said means for communicating information between the order picking units and the system computer is by wireless radio frequency data communication (RF/DC).

4. A system for aiding order picking personnel in picking orders according to claim 1 wherein said order picking units are battery powered.

5. A system for aiding order picking personnel in picking orders according to claim 3 wherein said means for communicating information between said order picking units and order picking personnel includes a speaker mounted on the order picking unit for audibly conveying said information.

6. A system for aiding order picking personnel in picking orders according to claim 3 wherein the order picking units move along the rail system in response to instructions from the system computer, thereby leading order picking personnel directly to the storage location for the inventory items to be picked.

7. A system for aiding order picking personnel in picking orders according to claim 1 additionally comprising an external bar code scanner connectable to said order picking units.

8. A system for aiding order picking personnel in picking orders according to claim 1 additionally comprising a printing means connectable to said order picking units.

9. A system for aiding order picking personnel in picking orders according to claim 1 wherein said means for communicating information between the order picking units and the system computer is a hard wired power rail.

10. A system for aiding order picking personnel in picking orders according to claim 1 wherein said order picking unit can be used to aid in performing inventory audits and inventory counts.

11. A system for aiding order picking personnel in picking orders according to claim 1 additionally comprising a plurality of homing devices spaced along the rail system which check and if necessary recalibrate the rotary encoders to maintain the correct position information of said units.

12. An order picking system comprising:
   (a) a rail line as an integral part of the order picking system arranged in a fixed path above the floor;

(b) a support means for supporting the rail line at a selected height above the floor;

(c) a picking device mounted for movement along the rail line, said device including an incremental rotary position encoder operable to provide continuous signals which are converted into data indicative of the precise location and direction of the movement of the picking device relative to said rail line, and one or more homing devices spaced along said rail line to check the accuracy of said signals;

(d) means for powering the picking device;

(e) a touch sensitive display apparatus mounted on the picking device connected to a computer system for controlling said order picking system.

13. An order picking system according to claim 12 additionally comprising an incremental encoding means for precisely determining the location and controlling the movements of said picking device.

14. An order picking system according to claim 13 wherein said means for powering the picking device is a battery integrally connected to said picking device.

15. An order picking system according to claim 12 wherein said picking device communicates with a central computer system by wireless radio frequency data communication (RF/DC).

16. A method for aiding order picking personnel in picking items of inventory comprising the steps of:

(a) receiving an order for an item of inventory stored in an inventory system at a predetermined storage location in a linearly extended storage rack system along a track arrangement;

(b) keying of the order into the paperless automated order selection control system;

(c) communicating the order and instructions regarding said order to one or more order picking units, wherein said one or more order picking unit move along the track arrangement, counting increments of track over which it is moved by monitoring rotational movement of the drive systems of said one or more picking units and stopping when a predetermined count has been reached at the storage location where the item of inventory is stored;

(d) picking of the ordered goods by order picking personnel; and (e) verifying said picking by inputting such information into a touch sensitive display screen on an order picking unit, wherein such information is transmitted to the order selection control system.

17. The method of claim 16, wherein the step of transmitting order information to one or more order picking units is carried out using RF transmission.

18. The method of claim 16, wherein the step of transmitting order information to one or more order picking units is carried out using a hard wired power rail system.

* * * * *